May 12, 1925.
J. W. McCARTER
REVERSIBLE PLOW
Filed April 12, 1923
1,537,841
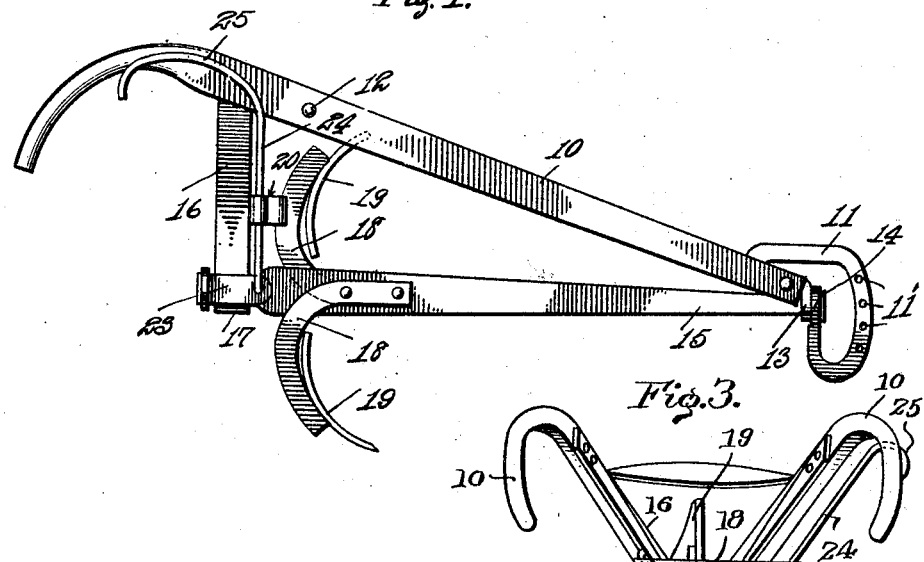
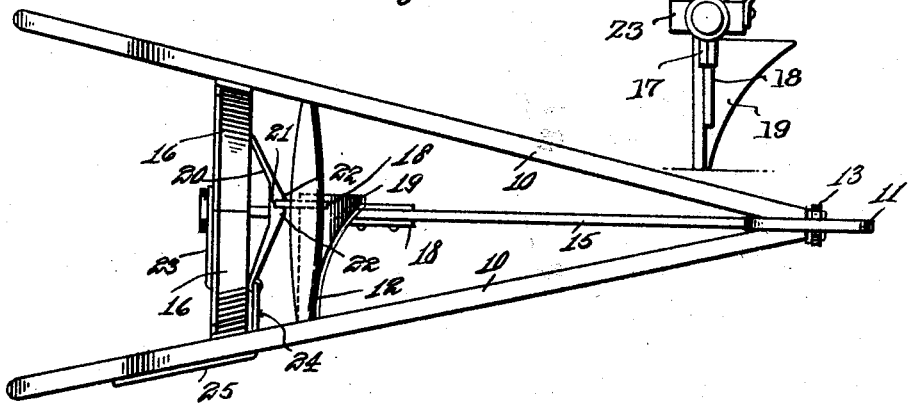
Inventor
John W. McCarter.
By
Attorney Patented May 12, 1925.

1,537,841

UNITED STATES PATENT OFFICE.

JOHN W. McCARTER, OF WEDOWEE, ALABAMA.

REVERSIBLE PLOW.

Application filed April 12, 1923. Serial No. 631,605.

*To all whom it may concern:*

Be it known that I, JOHN W. McCARTER, a citizen of the United States, residing at Wedowee, in the county of Randolph, State of Alabama, have invented certain new and useful Improvements in Reversible Plows; and I do hereby declare the following to be a full, clear, and exact description of the invention, such as will enable others skilled in the art to which it appertains to make and use the same.

This invention relates to new and useful improvements in plows and particularly to reversible plows.

One object of the invention is to provide a reversible plow having novel means for holding the revolving plow elements against accidental displacement.

Another object is to provide a novel and improved form of plow frame for supporting the revolvable shaft which carries the plow elements.

Other objects and advantages will be apparent from the following description when taken in connection with the accompanying drawing.

In the drawing:

Figure 1 is a side elevation of a plow made in accordance with the invention.

Figure 2 is a top plan view of the same.

Figure 3 is a rear elevation of the plow.

Referring particularly to the accompanying drawing, 10 represents a pair of handle bars which are secured together and to an approximately L-shaped member 11, at their forward ends, while their rear end portions are held in spaced divergent relation by the transverse bar 12. The upper horizontal leg of the member 11 extends downwardly and forwardly between the ends of the handle bars, and depends vertically downward in the form of a bearing eye 13. The lower end of the vertical leg of the member 11 is turned upwardly and rearwardly and formed with a terminal eye 14, aligning with the eye 13, and receiving rotatably therein the forward reduced end of the revolvable plow beam shaft 15.

Secured to the rear portions of the handle bars 10, and extending downwardly in convergent relation, are the braces 16, the convergent portions of said braces being formed with a bearing eye 17, receiving the rear reduced end of the shaft or beam 15 rotatably therein. Secured to opposite side faces of the rear end portion of the shaft 15 are the curved standards 18, to the outer end of each of which is secured the plow element or blade 19. It will be noted that the blade 19, of one standard is a left-handed shovel, while that of the other standard is a right-handed shovel. Thus, when the operator has plowed to one end of a field, and wishes to return, he swings or rotates the shaft 15 to present the other shovel to the ground, whereby the turf will be turned over, when coming back to the starting point, in the same direction as when going in the original direction. This obviates the usual practice of plowing around a field to throw the turf in the same direction. Secured at one end to one of the braces, and extending horizontally across the device, and slightly beyond the other brace, is a flexible bar 20, which has on its intermediate portion, and the rear face thereof, the notch 21, from opposite sides of which are the inclined lugs 22. This notch is arranged to receive the rear edge of a portion of the standard 18 which is uppermost, to maintain the shaft 15 against rotation, during the operation of the plow. Pivotally supported on a bracket 23, which is carried by the rear bearing eye 17, is a vertical lever 24, and connected to the intermediate portion of this lever is the adjacent end of the flexible bar 20, said lever having a handgrip 25, on its upper end, which is grasped by the operator to flex the bar rearwardly so as to release the standard from the notch of the bar, and thereby permit the operator to rotate the shaft 15, and place the other shovel in the ground.

The vertical leg of the L-shaped member 11 is formed with a longitudinal series of openings 11', for reception of the pin of a clevis, not shown, but which will be readily understood.

What is claimed is:

1. A reversible plow comprising converging handle bars, a bearing carried by the converging ends of the bars, a bearing below and supported by the other ends of the bars, a revolvable shaft rotatably supported in the bearings and extending longitudinally of the handle bars, plow standards carried by and rotatable with the shaft, and a flexible notched means supported below the rear ends of the handle bars in position to receive the standards, successively, for holding the shaft against rotation.

2. A reversible plow comprising forwardly converging handle bars, a bearing eye carried by the convergent ends of the bars and adapted for attachment of a clevis, converging braces depending from the rear portions of the bars, a bearing eye carried by the convergent ends of the braces, a shaft having its ends rotatably supported in the bearing eyes, plow standards radiating from the shaft, a notched resilient member carried by the braces in position to alternately receive portions of the said standards, whereby to maintain the shaft against rotation and one of the plow standards in operative relation to the ground, and means for flexing the notched member to release a standard.

3. A reversible plow comprising downwardly and forwardly converging handle bars, a member connected with the convergent ends of said handle bars and formed with openings for attachment of a clevis, said member being formed with a bearing eye, downwardly and inwardly converging braces carried by the rear ends of the handle bars, a bearing eye carried by the convergent ends of the braces, a longitudinal shaft having its ends reduced and rotatably supported in the said bearing eyes, plow standards carried by and rotatable with the shaft, a transversely extending flexible and notched bar carried by one of the braces for engagement successively with the standards when the shaft is revolved, and an operating lever supported on the rear bearing eye and operatively connected with the flexible bar.

In testimony whereof, I affix my signature, in the presence of two witnesses.

JOHN W. McCARTER.

Witnesses:
 H. R. JONES,
 R. A. MOORE.